United States Patent [19]
Arnold

[11] Patent Number: 5,059,030
[45] Date of Patent: Oct. 22, 1991

[54] PASSIVE RING RESONATOR LASER ANGULAR RATE SENSOR

[76] Inventor: Steven M. Arnold, 5929 Dupont Ave., South, Minneapolis, Minn. 55419

[21] Appl. No.: 681,399

[22] Filed: Dec. 13, 1984

[51] Int. Cl.$^5$ .......................... G01C 19/64; G01B 9/02
[52] U.S. Cl. .................................................... 356/350
[58] Field of Search .......................... 356/350; 372/94; 350/96.13, 358

[56] References Cited

U.S. PATENT DOCUMENTS

| | | | |
|---|---|---|---|
| 4,135,822 | 1/1979 | Ezekiel | 356/350 |
| 4,273,445 | 6/1981 | Thompson et al. | 356/350 |
| 4,326,803 | 2/1982 | Lawrence | 356/350 |

OTHER PUBLICATIONS

"Integrated Optical Acousto-Optic Switching", Keasten, SPIE, 10-1984, pp. 258-266.
"Optical-Gyroscope Application of Efficient Crossed-Channel Acoustooptic Devices", Ching T. Lee, Appl. Physics B 35, pp. 113-118 (1984).
"Passive Ring Resonator Method for Sensitive Inertial Rotation Measurements in Geophysics and Relativity", G. A. Sanders et al. Optics Letters, vol. 6, p. 569, Nov. 1981.
"Theory of Dielectric Waveguides", H. Kogelink, Integrated Optics, p. 71, Springer-Verlag, New York 1975.
"Passive Ring Resonator Laser Gyroscope", S. Ezekiel et al, Applied Physics Letters, vol. 30, No. 9, May 1, 1977.
"Guided Wave Optics", Henry F. Taylor et al, Proceedings of the IEEE, vol. 62, No. 8, Aug. 1974.
"Rayleigh Backscattering in Optical Passive Ring-Resonator Gyro", K. Iwatsuki et al.
"Efficient Acoustooptic Diffraction in Crossed Channel Waveguides and Resultant Integrated Optic Module", C. S. Tsai et al, 422 Ultrasonics Symposium, 1982 IEEE.
"Passive Fiber-Optics Ring Resonator for Rotation Sensing", R. E. Meyer et al., Optics Letters, vol. 8, No. 2, Dec. 1983, pp. 644-646.

Primary Examiner—Vincent P. McGraw
Assistant Examiner—S. A. Turner
Attorney, Agent, or Firm—Robert A. Pajak

[57] ABSTRACT

In an angular rate sensor including a plurality of thin film waveguides and a directional coupler, a plurality of interdigitated transducers arranged to propagate energy into the waveguides and detect the resulting counter-propagating waves.

10 Claims, 2 Drawing Sheets

PASSIVE RING RESONATOR LASER ANGULAR RATE SENSOR

BACKGROUND OF THE INVENTION

This invention relates to the field of optical angular rate sensors of the passive ring resonator type typified in Lawrence U.S. Pat. No. 4,326,803. In such an instrument a passive waveguide provides a closed loop propagation path for optical signals about a measurement axis. Coherent optical signals are coupled into the path for propagation in opposite directions therearound: as pointed out by Sagnac, the effective length of this path varies with the direction and rate of the rotation of the instrument about the measurement axis. The frequencies of the oppositely propagating signals are adjusted to make them resonant in the propagation path, and output coupling means samples the two frequencies, maintains them at resonant values, and determines their difference as a measure of the rate of rotation of the instrument.

SUMMARY OF THE INVENTION

The present invention makes use of acousto-optic deflector/modulator means having a novel structure to supply and sample the counterpropagating signals in such a resonator, for maintaining them resonant and determining their frequency difference.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals identify corresponding parts throughout the several views.

DETAILED DESCRIPTION OF THE PREFERRED EMBODIMENT

Figure 1:
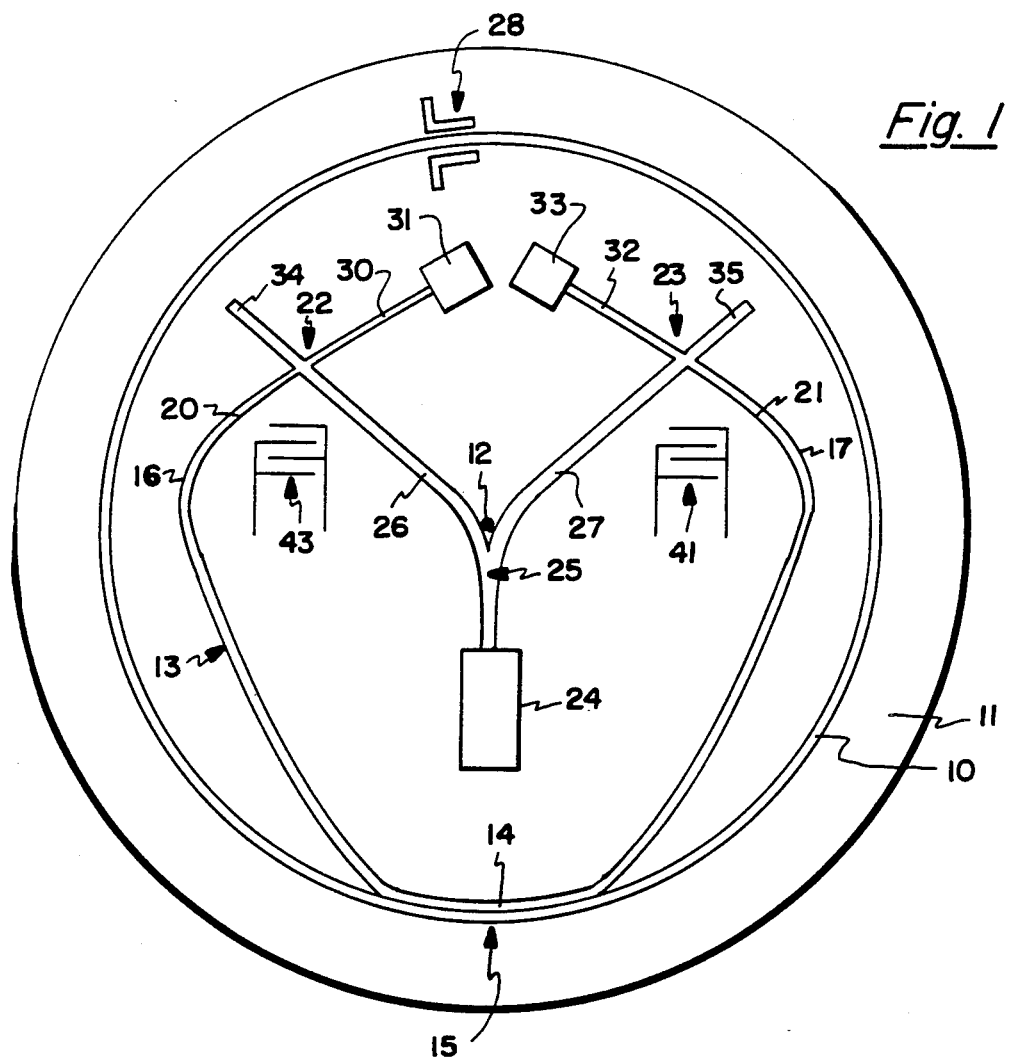
FIG. 1 illustrates a first embodiment of the invention, FIG. 2 gives details of frequency shifting apparatus used in the invention.

Turning now to FIG. 1, there is shown a first embodiment of the invention using thin film passive optical waveguides. A first single mode channel thin film waveguide 10 formed on a planar substrate 11 of $Z_nO/Si$ acts as a ring resonator and provides a closed loop propagation path about an axis 12 normal to the substrate: the substrate is mounted for rotation about that axis by suitable means not shown. A second similar waveguide 13 has a mid-portion 14 arranged to coact with waveguide 10 as a directional coupler 15. Optical signals are supplied to the ends 16 and 17 of waveguide 13 from waveguides 20 and 21 respectively of a pair of similar crossed-channel acousto-optic devices 22 and 23. A controllable frequency diode laser suggested at 24 acts through a power divider 25 to supply first and second optical signals at a frequency $f_0$, on waveguides 26 and 27, to devices 22 and 23. An electro-optical modulator 28 acts on waveguide 10 to continuously vary the effective path length therein, and hence the resonant frequency thereof, sinusoidally through a small range.

Waveguide 20 extends beyond shifter 22 at 30 to a detector 31, and waveguide 21 extends beyond shifter 23 at 32 to detector 33. Waveguides 26 and 27 also extend beyond shifters 22 and 23 to terminate at traps 34 and 35, all respectively.

Figure 2:
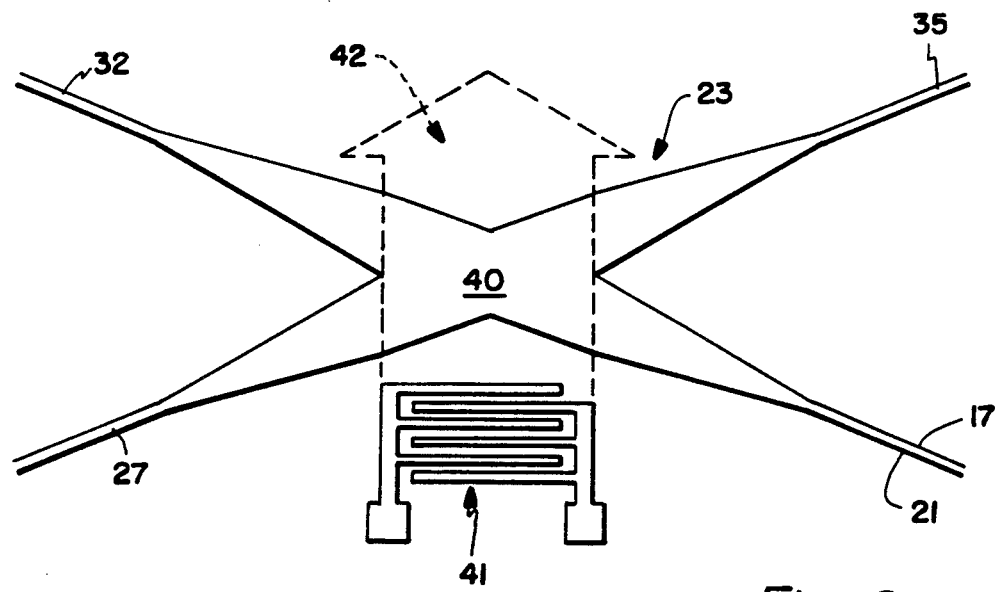

Devices 22 and 23 are of the same nature, and FIG. 2 shows device 23 schematically in more detail. It includes a crossed-channel waveguide area 40, the channels crossing at an angle which for parameters appropriate to this device might be about 3.6 degrees. An interdigitated transducer or generator 41, the center frequency $f_1$ of which is such that the corresponding Bragg angle is equal to one half the intersection angle of the waveguides, launches a surface acoustic wave 42 across area 40, so that a portion of the laser energy from power divider 25 entering at 27 does not proceed to 35, but is deflected to emerge at 21. The shifted laser beam supplied to end 17 of waveguide 13 is of frequency $(f_0+f_1)$. A first portion of this beam is coupled into ring resonator 10 in the clockwise direction as seen in FIG. 1, and a second portion is reflected at coupler 15 and continues through waveguides 13 and 20, shifter 22, and waveguide 30 to detector 31. Likewise at coupler 15 a portion of the clockwise beam in waveguide 10 is coupled back to waveguide 13 and hence through waveguide 20, shifter 22, and waveguide 30 to detector 31.

In the same way, frequency shifter 22 has a generator 43, and a portion of the signal supplied at 26 from power divider 25 does not proceed to 34 but is displaced to emerge at 20. Generator 43 is excited at a frequency $f_2$, and the shifted laser beam supplied to end 16 of waveguide 13 is of frequency $(f_0+f_2)$. A portion of this beam is coupled into ring resonator 10 in the counterclockwise direction, as seen in FIG. 1, and a portion is reflected at coupler 15 and continues through waveguides 17 and 21, shifter 23, and waveguide 32 to detector 33. Likewise at coupler 15 a portion of the counterclockwise beam in waveguide 10 is coupled back to waveguide 13 and hence through waveguide 21, shifter 23, and waveguide 32 to detector 33.

Figure 3:
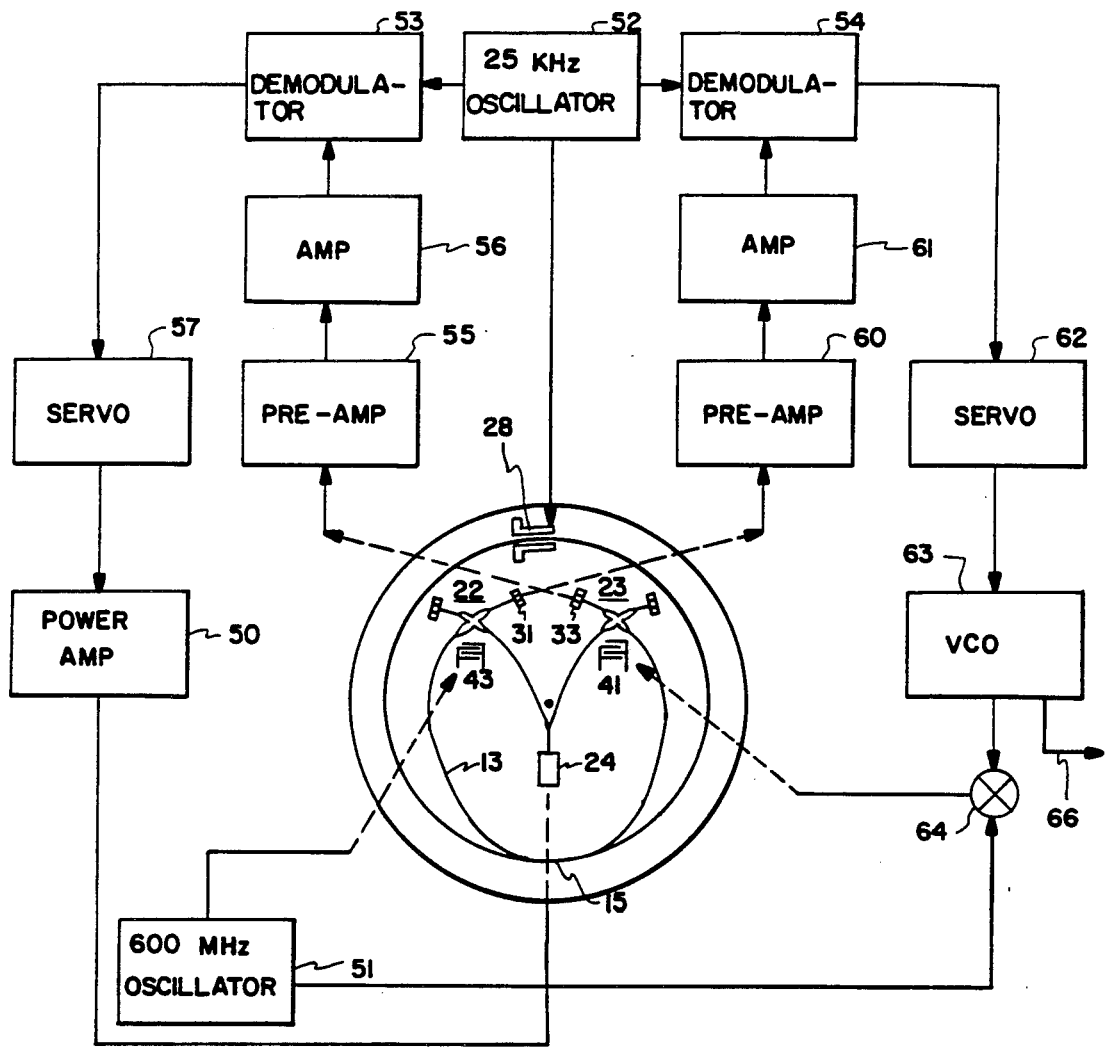
FIG. 3 shows a complete system usable in practice of the invention.

Attention is now directed to FIG. 3, where it is shown that laser diode 24 is energized from a power amplifier 50: varying the power supplied at 50 varies the frequency $f_0$ of the laser slightly by changing its temperature.

As shown in FIG. 3, generator 43 is excited at frequency $f_2$ by a constant frequency oscillator 51. Modulator 28 is energized from a constant frequency oscillator 52. Oscillator 52 also presents a reference signal to a pair of demodulators 53 and 54. The output of detector 33 is supplied through a preamplifier 55, an amplifier 56, demodulator 53 and a servo 57 to power amplifier 50. The output of detector 31 is supplied through a preamplifier 60, an amplifier 61, demodulator 54 and a servo 62 to a voltage controlled oscillator 63, the output of oscillator 63 being combined in a single side band mixer 64 with the output of constant frequency oscillator 51, to supply generator 41 of frequency shifter 23.

The angular rate signal from the device is taken as the output 66 of oscillator 63.

In one proposed embodiment of the invention, laser 24 operated at a wavelength of 0.83 microns or a frequency of $3.6 \times 10^8$ megahertz, oscillator 51 was at 600 megahertz frequency, and oscillator 52 was at 25 kilohertz frequency.

OPERATION

The operation of this angular rate sensor is as follows. Consider first the state of the device when it is not rotating about axis 12. An optical signal of frequency $f_0+f_2$ is being supplied by frequency shifter 22 through waveguide 13 and coupled counterclockwise into ring 10 at coupler 15, but a portion of the signal passes coupler 15 and goes through frequency shifter 23 to detector 33. It is a characteristic of coupler 15 that the amount of energy transferred between waveguides 13 and 10 is greatest at the resonant frequency of the ring. This means that for resonance the output of detector 33 is minimum, and $f_0$ is to be adjusted to minimize the intensity of $f_0+f_2$ as sensed at detector 33.

The signal in loop 10 has been modulated at 28, and components 55, 56, 53, 57, and 50 operate to change the frequency of laser 24 to minimize the intensity of the signal reaching the detector, and hence to cause the counterclockwise optical signal to achieve a resonance in the ring 10 by varying the frequency $f_0$: frequency $f_2$ does not change.

At the same time an optical signal of frequency $f_0+f_1$ is being supplied by frequency shifter 23 and coupled clockwise into ring 10. A portion of this signal passes through shifter 22 to detector 31. This signal is also modulated at 28.

Components 60, 61, 54, and 62 function to control the frequency of voltage controlled oscillator 63 to modify the output of fixed oscillator 51 so that the sum of these outputs, namely f1, has such a value that when combined with $f_0$ set as above-described, the sum $f_0+f_1$ is equal to $f_0+f_2$, the resonance frequency of the ring 10.

Now suppose the unit rotates about axis 12 at a rate $\Omega$, in a clockwise direction. The effective length of the resonator in the counter-clockwise direction decreases, so that its resonant frequency increases, and the signal to detector 31 decreases, and $f_0$ is adjusted as described above until $f_0+f_2$ is equal to the new resonant frequency. At the same time the effective length of the resonator in the clockwise direction decreases, so that its resonant frequency increases, and $f_1$ is adjusted as described above until $f_0+f_1$ is equal to the new resonant frequency. The frequency of oscillator 63 required to do this is a measure of the rate of rotation $\Omega$, and can be taken as the output of VCO 63 at 66.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. A passive ring resonator laser angular rate sensor comprising:
   ring resonator means including a first thin film waveguide for providing a closed loop propagation path;
   coupling means having first and second end ports for
   (i) receiving first and second coherent waves injected into said first and second end ports, respectively,
   (ii) coupling a first portion of said first wave into said ring resonator in a first direction, and passing out of said second end port substantially the remaining portion of said first wave, and
   (iii) coupling a first portion of said second wave into said ring resonator in a second direction, and passing out of said first end port substantially the remaining portion of said second wave;
   a first thin film crossed-channel waveguide having first and second channels which cross at an angle to define a first crossed-channel area, said first channel including first and second channel ends, and said second channel including first and second channel ends;
   means for injecting a third coherent wave of frequency $f_a$ into said first end of said first channel;
   first frequency shifting means for launching a first acoustic wave of a first frequency $f_1$ across said first cross-channel-area to produced said first wave having a frequency $f_a+f_1$ exiting from said second end of said second channel; and
   first detector means for providing a first output signal representative of the intensity of said remaining second wave portion following a path exiting from said first end port, through said second end of said second channel, and emerging from said first end of said second channel.

2. The apparatus of claim 1 wherein said ring resonator, said coupling means, said first thin film cross-channel waveguide, and said first connecting waveguide means are on a single substrate.

3. The apparatus of claim 1 including means responsive to said remaining portion of said first wave emerging from said second end port for controlling the frequency $f_1$ of said first wave to be at the resonant frequency of said ring resonator in said first direction.

4. The sensor of claim 1 further comprising:
   a second thin film cross-channel waveguide having third and fourth channels which cross at an angle to define a second crossed-channel-area, said third channel including first and second channel ends, and said fourth channel including first and second channel ends;
   means for injecting a fourth coherent wave of frequency $f_b$ into said first end of said third channel;
   second frequency shifting means for launching a second acoustic wave of a second frequency $f_2$ across said second crossed-channel-area to produce said second wave having a frequency $f_b+f_2$ exiting from said second end of said fourth channel; and
   second detector means for providing a second output signal representative of the intensity of said remaining first wave portion following a path, exiting from said second end port, through said second end of said fourth channel, and emerging from said first end of said fourth channel.

5. The apparatus of claim 4 further comprising:
   means for controlling the frequency of said second wave so that said second wave is at the resonant frequency of said ring resonator in said second direction; and
   means responsive to said second output signal for controlling the frequency $f_1$ of said first frequency shifting means so that said first wave is at the resonant frequency of said ring resonator in said first direction.

6. The sensor of claim 5 wherein said first and second frequency shifting means each comprise an interdigitated transducer.

7. The apparatus of claim 5 further comprising:
means responsive to said second output signal for controlling the frequency $f_1$ of said first frequency shifting means so that said first wave is at the resonant frequency of said ring resonator in said first direction; and
means responsive to said first output signal for controlling the frequency $f_2$ of said second frequency shifting means so that said second wave is at the resonant frequency of said ring resonator in said second direction.

8. The apparatus of claim 5 further comprising:
means responsive to said first output signal for controlling the frequency $f_b$ so said second wave is at the resonant frequency of said ring resonator in said second direction; and
means responsive to said second output signal for controlling the frequency $f_1$ of said first frequency shifting means so that said first wave is at the resonant frequency of said ring resonator in said first direction.

9. The apparatus of claim 5 further comprising:
means for generating a first reference coherent wave having a first reference frequency; and
means for power dividing said reference wave into said third and fourth coherent waves having identical frequencies $f_a$ and $f_b$ equal to said first reference frequency.

10. The apparatus of claim 9 further comprising:
laser diode means for generating said first reference wave having said first reference frequency in response to a power control input signal;
means responsive to said second output signal for controlling the frequency $f_1$ of said first frequency shifting means so that said first wave is at the resonant frequency of said ring resonator in said first direction; and
control means responsive to said first output signal for providing said power control signal to alter said first reference frequency and cause said second wave to be at the resonant frequency of said ring resonator in said second direction.

* * * * *

UNITED STATES PATENT AND TRADEMARK OFFICE
CERTIFICATE OF CORRECTION

PATENT NO. : 5,059,030
DATED : October 22, 1991
INVENTOR(S) : STEVEN M. ARNOLD

It is certified that error appears in the above-identified patent and that said Letters Patent is hereby corrected as shown below:

Column 4, Claim 1, Line 19, delete "cross-channel-area" and insert --crossed-channel-area--.

Column 4, Claim 1, Line 19, delete "produced" and insert --produce--.

Signed and Sealed this

Twenty-seventh Day of April, 1993

Attest:

MICHAEL K. KIRK

*Attesting Officer*       *Acting Commissioner of Patents and Trademarks*